United States Patent
Einstein et al.

(10) Patent No.: US 12,479,430 B2
(45) Date of Patent: Nov. 25, 2025

(54) BLINDSPOT AWARE ADAPTIVE CRUISE CONTROL

(71) Applicant: TOYOTA MOTOR ENGINEERING & MANUFACTURING NORTH AMERICA, INC., Plano, TX (US)

(72) Inventors: Noah M. Einstein, Ann Arbor, MI (US); David Hernandez, Ann Arbor, MI (US); Raja Manas Macherla, Ann Arbor, MI (US); Emily S. Lerner, Ypsilanti, MI (US); Arlo C. Eitzer, Ann Arbor, MI (US); Ben J. Groelke, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 238 days.

(21) Appl. No.: 18/160,168

(22) Filed: Jan. 26, 2023

(65) Prior Publication Data
US 2024/0253627 A1    Aug. 1, 2024

(51) Int. Cl.
*B60W 30/16* (2020.01)
*B60W 50/14* (2020.01)

(52) U.S. Cl.
CPC ............ *B60W 30/16* (2013.01); *B60W 50/14* (2013.01); *B60W 2050/146* (2013.01);
(Continued)

(58) Field of Classification Search
CPC ................. B60W 30/16; B60W 50/14; B60W 2050/146; B60W 2420/408; B60W 2554/4041; B60W 2554/80
See application file for complete search history.

(56) References Cited

U.S. PATENT DOCUMENTS

| | | |
|---|---|---|
| 9,487,212 B1 | 11/2016 | Adam et al. |
| 11,254,311 B2 | 2/2022 | Chow |

(Continued)

FOREIGN PATENT DOCUMENTS

| | | |
|---|---|---|
| CN | 114222691 A | 3/2022 |
| EP | 2492165 B1 | 10/2013 |

(Continued)

OTHER PUBLICATIONS

Harris Automotive Service, Inc., "How your car accelerator works," 2021 (Year: 2021).*

(Continued)

*Primary Examiner* — Ig T An
*Assistant Examiner* — Stephanie T Su
(74) *Attorney, Agent, or Firm* — HAYNES AND BOONE, LLP

(57) ABSTRACT

Method and systems for determining when to accelerate, decelerate, or maintain current speed of cruise control based on the blindspots of vehicles. Distances between a vehicle and one or more surrounding vehicles are measured using a plurality of sensors. These measurements are used to determine if a vehicle has a surrounding vehicle in its blindspot or if the vehicle is in the blindspot of the surrounding vehicle. Cost calculations are made to determine the individual cost calculations of maintaining current speed versus changing the acceleration. The lowest cost calculation is selected and implemented by the vehicle such that velocity is maintained or acceleration of the vehicle is changed.

16 Claims, 9 Drawing Sheets

(52) U.S. Cl.
CPC ............. *B60W 2420/408* (2024.01); *B60W 2554/4041* (2020.02); *B60W 2554/80* (2020.02)

(56) References Cited

U.S. PATENT DOCUMENTS

| | | | |
|---|---|---|---|
| 2012/0218124 A1* | 8/2012 | Lee | B60W 30/18163 |
| | | | 340/904 |
| 2013/0226408 A1* | 8/2013 | Fung | G08G 1/166 |
| | | | 701/1 |
| 2016/0259334 A1* | 9/2016 | Hashimoto | B60W 60/0059 |
| 2017/0101096 A1 | 4/2017 | Kim | |
| 2017/0297574 A1 | 10/2017 | Trageser | |
| 2021/0089030 A1* | 3/2021 | Mehdi | G01C 21/3492 |
| 2022/0315051 A1* | 10/2022 | Patel | B60W 60/0027 |
| 2024/0217552 A1* | 7/2024 | Mccawley | B60W 60/0015 |

FOREIGN PATENT DOCUMENTS

| | | |
|---|---|---|
| JP | 2020129336 A1 | 8/2020 |
| KR | 20130110300 A | 10/2013 |

OTHER PUBLICATIONS

ISS Automotive, "Throttle Performance: Increase Acceleration And Speed!," 2021 (Year: 2021).*

* cited by examiner

BLINDSPOT AWARE ADAPTIVE CRUISE CONTROL

TECHNICAL FIELD

The present disclosure generally relates to cruise control for an automotive vehicle, and, more particularly, to a cruise control that actively monitors for surrounding vehicles and positions the automotive vehicle outside of a blind spot.

BACKGROUND

Modern motor vehicles often include Advanced Driver Assistance Systems (ADAS) that help the vehicle driver, or briefly take over for the driver, while the vehicle is being parked or driven. One such feature with a long history is cruise control, which can be activated by the vehicle driver and which adjusts the vehicle throttle to maintain a constant speed in the face of changing road conditions such as road slope. Adaptive Cruise Control (ACC) functions may also reduce the vehicle throttle in order to, for example, maintain safe following distance behind a vehicle located in front of the ego vehicle. Vehicles with ACC allow the ego vehicle to maintain a specified set speed, while decreasing that speed in the presences of a preceding vehicle. Additionally, some vehicles include Blind Spot Monitoring (BSM), which will alert the ego vehicle if surrounding vehicles are in the ego vehicle's blindspot. However, when the driver of the ego vehicle uses the current systems for ACC, if vehicles are present in an adjacent lane, the ego vehicle may be placed in the blindspot of a surrounding vehicle or place the surrounding vehicle in the blindspot of the ego vehicle. This position is a potentially dangerous and unsafe position for the ego vehicle. Therefore, there is a need therefore exists for improved cruise control functions that address this and other problems.

SUMMARY

In one example embodiment, a method for implementing a blindspot aware cruise control is provided. The distances to one or more surrounding vehicles are measured using a plurality of sensors of a vehicle. If the vehicle has a surrounding vehicle of the one or more surrounding vehicles in a blindspot of the vehicle is determined using the measured distances. After determining that the surrounding vehicle is in the blindspot of the vehicle, individual cost calculations are calculated. The individual cost calculations include a first cost calculation and a second cost calculation. The first cost calculation is a cost of not changing acceleration of the vehicle. The second cost calculation is a cost of changing the acceleration of the vehicle. The lowest cost calculation between the calculated first cost calculation and the calculated second cost calculation is selected and implemented such that speed is maintained or acceleration of the vehicle is changed.

In another example embodiment, a system includes an electronic fuel injector. The electronic fuel injector is used to deliver fuel to an engine. The system also includes a vehicle control unit. The vehicle control unit is in communication with the electronic fuel injector, and the vehicle control unit controls when the electronic fuel injector operates. The system also includes a sensor system, and the sensor system includes: a plurality of sensors coupled to a vehicle that are configured to measure distances to one or more surrounding vehicles. The sensor system is in communication with the vehicle control unit. The vehicle control unit determines, using the distances, if the vehicle has a surrounding vehicle of the one or more surrounding vehicles in a blindspot of the vehicle; and calculates, after determining that the surrounding vehicle is in the blindspot of the vehicle, individual cost calculations. The individual cost calculations include a first cost calculation and a second cost calculation. The first cost calculation is a cost of not changing acceleration of the vehicle. The second cost calculation is a cost of changing the acceleration of the vehicle. The vehicle control unit also selects a lowest cost calculation between the calculated first cost calculation and the calculated second cost calculation and in response to the selection, sends an actuation command to the electronic fuel injector to change the acceleration of the vehicle by injecting more or less fuel.

In yet another example embodiment, a method for implementing a blindspot aware cruise control is provided. Distances to the one or more surrounding vehicles are measured using a plurality of sensors. If the vehicle has a surrounding vehicle of the one or more surrounding vehicles in a blindspot of the vehicle, or if the one or more surrounding vehicles have the vehicle in their respective blindspots is determined using the measured distances. After determining, calculate individual cost calculations. The individual cost calculations comprise a first cost calculation, a second cost calculation, and a third cost calculation. The first cost calculation relates to a cost of not changing acceleration of the vehicle. The second cost calculation relates to a cost of increasing the acceleration of the vehicle. The third cost calculation relates to a cost of decreasing the acceleration of the vehicle. The lowest cost calculation between the calculated first, second, and third cost calculations is selected. The lowest cost calculation is then implemented by sending commands to components of the vehicle to either maintain a current velocity, increase acceleration, or decrease acceleration based on the lowest cost calculation.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals, letters, or both in the various examples. This repetition is for the purpose of simplicity and clarity and does not in itself dictate a relationship between the various embodiments and/or configurations discussed.

DETAILED DESCRIPTION

Figure 1:
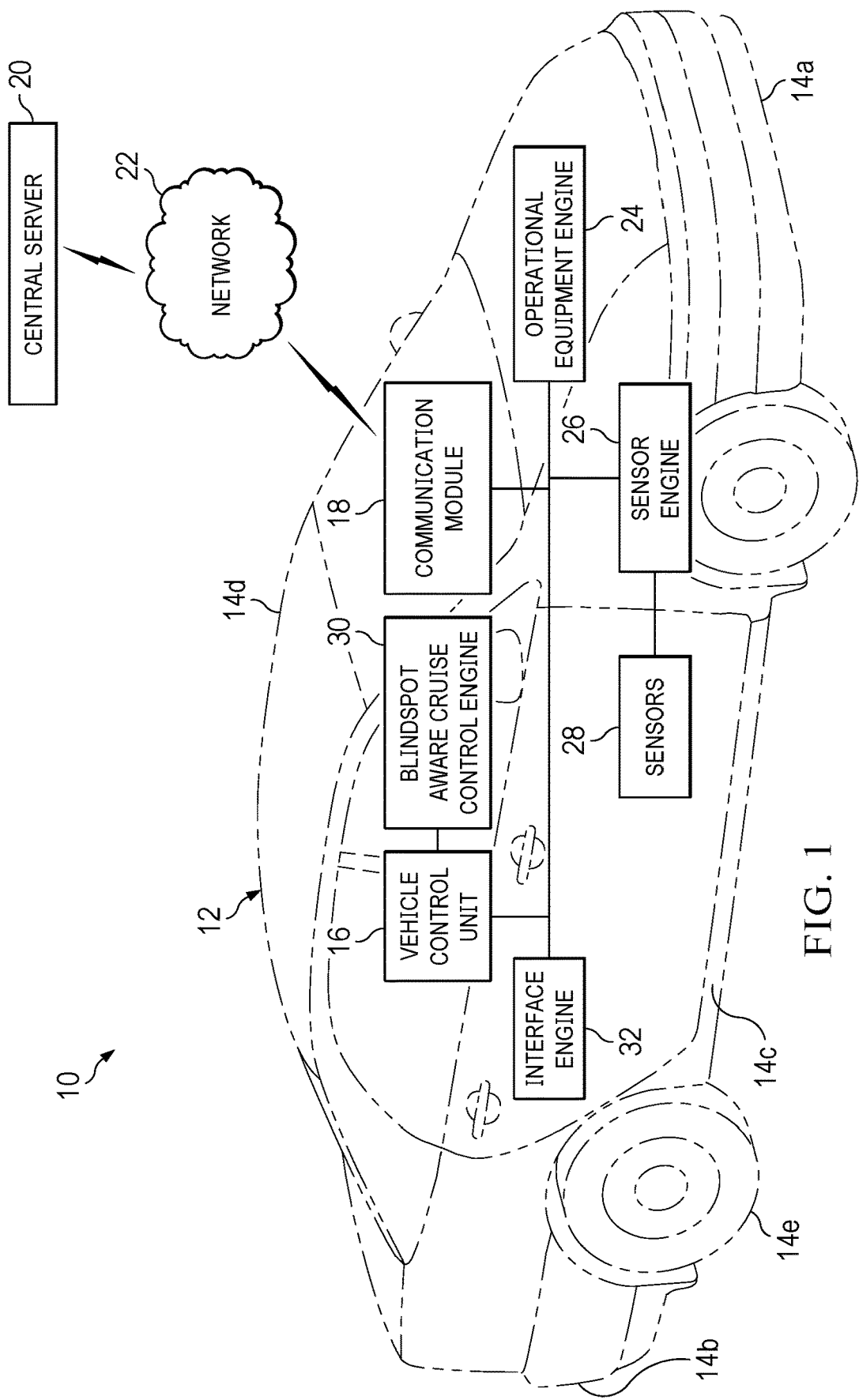
FIG. 1 is a diagrammatic illustration of a blindspot aware cruise control system, according to one or more embodiments of the present disclosure.

Illustrative embodiments and related methods of the present disclosure are described below as they might be employed in one or more methods and systems for using blindspot aware cruise control. In the interest of clarity, not all features of an actual implementation or method are described in this specification. It will of course be appreciated that in the development of any such actual embodiment, numerous implementation specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure. Further aspects and advantages of the various embodiments and related methods of the disclosure will become apparent from consideration of the following description and drawings.

The example embodiments described below recognize that it may be desirable to have methods and systems that more efficiently and safely manage adaptative cruise control (ACC) by adapting the cruise control based on blindspots, which will in turn increase usage of ACC and increase safety of drivers. In particular, the embodiments described below provide methods and systems for determining whether a vehicle has another vehicle in its blindspot and/or when the vehicle is in someone else's blindspot and using a cost analysis to determine if the vehicle should accelerate, decelerate, or stay the same speed. Therefore, the methods and systems provide an improvement to adaptive cruise control systems.

One or more embodiments described below provide methods and systems for considering if a first vehicle is in a blindspot of a second vehicle. The methods and systems may use a plurality of sensors to collect data in order to determine a first position of the first vehicle. The methods and systems also determine if the first position of the first vehicle is in the blindspot of the second vehicle. These methods and systems execute blindspot aware cruise control logic based on the sensor data. Once executed, the methods and systems determine the ideal action for the first vehicle to take to respond to being in the second vehicle's blindspot. For example, the blindspot aware cruise control logic may calculate that by accelerating for a short period of time, the first vehicle can safely and efficiently move from the second vehicle's blindspot, and based on that calculation, instruct the requisite components of the first vehicle to cause the first vehicle to accelerate from the first position to a new target location that is outside the second vehicle's blindspot.

One or more embodiments described below provide methods and systems for considering if a second vehicle is in a blindspot of a first vehicle. The methods and systems may use a plurality of sensors to collect data in order to determine a first position of the first vehicle. The methods and systems also determine if the first position of the first vehicle has a second vehicle in its blindspot. These methods and systems execute blindspot aware cruise control logic based on the sensor data. Once executed, the methods and systems determine the ideal action for the first vehicle to take to respond to having the second vehicle in its respective blindspot. For example, the blindspot aware cruise control logic may calculate that by decelerating for a short period of time, the first vehicle can safely and efficiently move away from the second vehicle that was previously in the first vehicle's blindspot, and based on that calculation, instruct the requisite components of the first vehicle to cause the first vehicle to decelerate from the first position to a new target location that places the second vehicle outside of the first vehicle's blindspot.

Referring to FIG. 1, in an embodiment, a blindspot aware cruise control system is generally referred to by reference numeral 10. In one example embodiment, the blindspot aware cruise control system 10 includes a vehicle 12. The vehicle 12 includes a front portion 14a, a rear portion 14b, a right-side portion 14c, a left-side portion 14d, and wheels 14e. The vehicle 12 includes a vehicle control unit 16 located on the vehicle 12. The blindspot aware cruise control system 10 includes a communication module 18. The communication module 18 is in communication with and/or operably coupled to the vehicle control unit 16. The communication module 18 is adapted to communicate wirelessly with a central server 20 via network 22. An operational equipment engine 24 is operably coupled to, and adapted to be in communication with, the vehicle control unit 16. A sensor engine 26 is operably coupled to, and adapted to be in communication with, the vehicle control unit 16. The sensor engine 26 is adapted to monitor various components of, for example, the operational equipment engine 24. The sensor engine 26 is also adapted to monitor one or more sensors 28. A blindspot aware cruise control engine 30 is operably coupled to, and adapted to be in communication with, the vehicle control unit 16. Additionally, an interface engine 32 is operably coupled to, and adapted to be in communication with, the vehicle control unit 16.

In some embodiments, the vehicle 12 may be an automotive vehicle. It is noted that the components of the vehicle 12 may be located either permanently or temporarily as a part of the vehicle 12. In one or more embodiments, the front portion 14a includes a front bumper, the rear portion 14b includes a rear bumper, the right-side portion 14c includes a right front quarter panel, a right front door, a right rear door, and a right rear quarter panel, and the left side portion 14d includes a left front quarter panel, a left front door, a left rear door, and a left rear quarter panel.

In some embodiments, the vehicle control unit 16 includes a processor and a memory. In one or more embodiments, the vehicle control unit 16 is in communication with a chassis electronics control unit (ECU), a brake ECU, and a power train ECU. In one or more embodiments, the chassis ECU controls elements of the vehicle's suspension system. In some embodiments, the brake ECU controls the braking system or elements thereof. In one or more embodiments, the power train ECU may be referred to as an engine ECU, power plant ECU, motor ECU, or transmission ECU controls elements of the motor and drivetrain. It is understood that other components or arrangements of components may be found in a vehicle 12, and that the same general principles apply to electric vehicles, internal combustion vehicles, and hybrid vehicles. For example, a power train ECU may control both motor and transmission components. Alternatively, a separate motor ECU and transmission ECU may exist, or some functions of a motor ECU or transmission ECU may be performed by the vehicle control unit 16.

In one or more embodiments, the communication module 18 may include a transmitter and a receiver. In some examples, one or the other of the transmitter and the receiver may be omitted according to the particular application for which the communication module is to be used. In other examples, the transmitter and receiver are combined into a single transceiver that performs both transmitting and receiving functions.

In some embodiments, the central server 20 is a cloud server. In one or more embodiments, the central server 20 may provide information and services including but not limited to include location, mapping, route or path, and topography information. In one or more embodiments, external communication (including but not limited to software updates, firmware updates, data transmission between the processor and central server 20, or readings from the blindspot aware cruise control system 10) may be accomplished using any suitable wireless or wired communication technology, e.g., a cable interface such as a USB, micro-USB, Lightning, Bluetooth, or the network 22. For example, the network 22 may include a 3G network, a 4G Network, a 5G network, Wi-Fi network, or the like.

In one or more embodiments, the operational equipment engine 24 may include a plurality of devices configured to facilitate driving of the vehicle 12. In this regard, the operational equipment engine 24 may be designed to exchange communication with the vehicle control unit 16, so as to not only receive instructions, but to provide information on the operation of the operational equipment engine 24. For example, the operational equipment engine 24 may include a vehicle battery, a motor, a drivetrain or transmission, a steering system, and a braking system. In some vehicles, the vehicle battery may provide electrical power to the motor to drive the wheels 14e of the vehicle 12 via the drivetrain. In some embodiments, the drivetrain is in communication with the blindspot aware cruise control engine 30 and/or the vehicle control unit 16. In some embodiments, the blindspot aware cruise control engine 30 instructs the drivetrain to vary the rate at which the wheels 14e are moving. In some examples, instead of or in addition to providing power to the motor to drive the wheels 14e of the vehicle 12 via the drivetrain or transmission, the vehicle battery provides electrical power to another component of the operational equipment engine, the vehicle control unit 16, the communication module 18, the sensor engine 26, the blindspot aware cruise control engine 30, the interface engine 32, or any combination thereof: In some embodiments, the motor is an internal combustion motor, and the battery operates a starter. In one or more embodiments, the vehicle stability control (VSC) and electronic fuel injector (EFI) are part of the operational equipment engine 24 and/or are in communication with the operational equipment engine 24. A VSC may be an electronic system that monitors steering direction and the direction of vehicle 12. A VSC may control brakes and/or reduce power to wheels 14e. In one or more embodiments, the VSC may be in communication with vehicle control unit 16 and/or the blindspot aware cruise control engine 30 (which may be a sub-component or sub-routine of the vehicle control unit 16). In some embodiments, the vehicle control unit 16 and/or the blindspot aware cruise control engine 30 controls the VSC and the braking of the vehicle 12 and/or uses the VSC to monitor the direction of the vehicle 12. An EFI may inject fuel into an engine. For example, when cruise control is not turned on, a driver presses the gas pedal to accelerate. The gas pedal is connected to a throttle valve which regulates how much air is in the engine. By pressing the gas pedal the vehicle control unit 16 (which in some embodiments, may be called an engine control unit) increases the fuel rate in response. The vehicle control unit 16 may control the EFI to control fuel delivery. In some embodiments, the EFI is in communication with the vehicle control unit 16 and/or the blindspot aware cruise control engine 30, and the vehicle control unit 16 and/or the blindspot aware cruise control engine 30 (which may be a sub-component of the vehicle control unit 16) directs the EFI to control fuel delivery to accelerate or decelerate the vehicle 12.

In some examples, the sensor engine 26 may include devices such as sensors 28, meters, detectors, or other devices configured to measure or sense a parameter related to a driving operation of the vehicle 12. The sensors 28 or other detection devices may be configured to sense or detect activity, conditions, and circumstances in an area to which the device has access, e.g., conditions inside or outside the vehicle cabin. Sub-components of the sensor engine 26 may be deployed at any operational area where information on the driving of the vehicle 12 may occur.

In some embodiments, readings from the sensor engine 26 are fed back to the vehicle control unit 16, brake ECU, power train ECU or hybrid ECU, and/or blindspot aware cruise control engine 30. Stored and reported performance data may include the sensed data, or may be derived, calculated, or inferred from sensed data. In some embodiments, the vehicle control unit 16 may send signals to the sensor engine 26 to adjust the calibration or operating parameters of the sensor engine 26 in accordance with a control program in the vehicle control unit 16. In one or more embodiments, the vehicle control unit 16 is adapted to receive and process performance data from the sensor engine 26 or from other suitable source(s), and to monitor, store (e.g., in the memory), and/or otherwise process (e.g., using the processor) the received performance data.

In one or more embodiments, the sensors 28 may include one or more sensors and one or more environmental sensors. For example, the sensors 28 may be one or more of: a front RADAR sensor, a front corner RADAR sensor, a rear RADAR sensor, a rear corner RADAR sensor, a side RADAR sensor, a long range RADAR sensor, a short range RADAR sensor, a LIDAR sensor, a global positioning system (GPS) or other positioning sensor (e.g., GLONASS, Galileo, LORAN, Wi-Fi triangulation, radio broadcast tower triangulation, or cell tower triangulation system, etc.), accelerator pedal deflection sensors, brake pedal deflection sensors, a shock/vibration sensor, a vehicle impact sensor, an airbag sensor, a braking sensor, an accelerometer or acceleration sensor, a speedometer, a tachometer, a battery load sensor, a vehicle identification device, a 2D or 3D camera, a weight sensor, or the like. In some embodiments, the sensor engine 26 sends the data from sensors 28, which may include any combination of: a front RADAR sensor, a rear RADAR sensor, a side RADAR sensor, a long-range RADAR sensor, a short-range RADAR sensor, and a LIDAR sensor, to the blindspot aware cruise control engine 30 for processing.

In one or more embodiments, the blindspot aware cruise control engine 30 is in direct communication with the sensor engine 26 and/or is operably coupled to the sensor engine 26. In one or more embodiments, the blindspot aware cruise control engine 30 is operably coupled to and/or in communication with the vehicle control unit 16. In some embodiments, the blindspot aware cruise control engine 30 is an Advanced Driver Assistance System (ADAS) and/or ADAS ECU. The Blindspot aware cruise control engine 30, in some embodiments, is a submodule of the ACC. In some embodiments, the blindspot cruise control engine 30 may be added as a submodule of ACC in edge compute, which allows it to meet regulatory and safety standards of existing ACC system and requires no additional hardware. In some embodiments, the blindspot aware cruise control engine 30 is a sub-module, component, or operably coupled to the vehicle control unit 16. In some embodiments, the blindspot aware cruise control engine 30 is logic stored in the vehicle control unit 16.

In some embodiments, the interface engine 32 provides visual indications to the driver of vehicle 12. In some embodiments, the interface engine 32 is a human machine interface. For example, the visual indication may include speed, if there is another vehicle in the driver's blindspot, if cruise control is activated, if blindspot aware cruise control is activated, or the like.

In one or more embodiments, the vehicle control unit 16 is adapted to communicate with the communication module 18, the operational equipment engine 24, the sensing engine 26, the blindspot aware cruise control engine 30, and the interface engine 32 to at least partially control the interaction of data with and between the various components of the blindspot aware cruise control engine 30. In addition to, or instead of, being operably coupled to, and adapted to be in communication with, the vehicle control unit 16, the communication module 18, the operational equipment engine 24, the sensor engine 26, the blindspot aware cruise control engine 30, and/or the interface engine 32 may be operably coupled to, and adapted to be in communication with, another of the components via wired or wireless communication (e.g., via an in-vehicle network).

The term "engine", such as for example, in blindspot aware cruise control engine, is meant herein to refer to an agent, instrument, or combination of either, or both, agents and instruments that may be associated to serve a purpose or accomplish a task-agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with any or all of the vehicle control unit 16, the communication module 18, the network 22, or a central server 20.

In operation, with continuing reference to FIG. 1, the sensors 28 measures distances of the vehicle 12 to surrounding vehicles and the sensor engine 26 collects these measurements. The measurements are sent to the vehicle control unit 16 and/or the blindspot aware cruise control engine 30. The measurements from the sensors 28 are aggregated and processed. Once processed, the measurements are used to calculate a mathematical cost function by the blindspot aware cruise control engine 30. The cost function determines what is the ideal action for the vehicle 12 to take by determining what is the lowest cost option and/or lowest cost calculation for the vehicle 12 to implement. The vehicle 12 may do nothing and remain at the same speed and distance to a surrounding vehicle or vehicles, the vehicle may move forward and accelerate for a short period of time to reduce distance to a surrounding vehicle, or the vehicle may move rearward or back and decelerate for a short period of time to increase distance to a surrounding vehicle. The blindspot aware cruise control engine 30 calculates and determines the lowest cost calculation and/or option. Once determined, the blindspot aware cruise control engine 30 may implement one of these options by sending an actuation request to the operational equipment engine 24. The operational equipment engine may then direct the request components to accelerate/decelerate as needed to avoid vehicle 12 from being in a blindspot of another vehicle or to avoid vehicle 12's blindspot. The blindspot aware cruise control engine 30 may also send a request to update the interface engine 32 to notify a driver of vehicle 12 that the vehicle 12 is about to accelerate or decelerate due to the blindspot aware cruise control.

In some embodiments, the communications module 18 and corresponding network 22 and central server 20 may be used to supply updates to the blindspot aware cruise control engine or to provide information for variables to the cost function.

In some embodiments, surrounding vehicles mean vehicles in the same lane in front or behind the vehicle 12 and/or surrounding vehicles in adjacent lanes to the right or left of the vehicle 12.

Before continuing, it should be noted that the examples described above are provided for purposes of illustration and are not intended to be limiting. Other devices and/or device configurations may be utilized to carry out the operations described herein.

Figure 2:
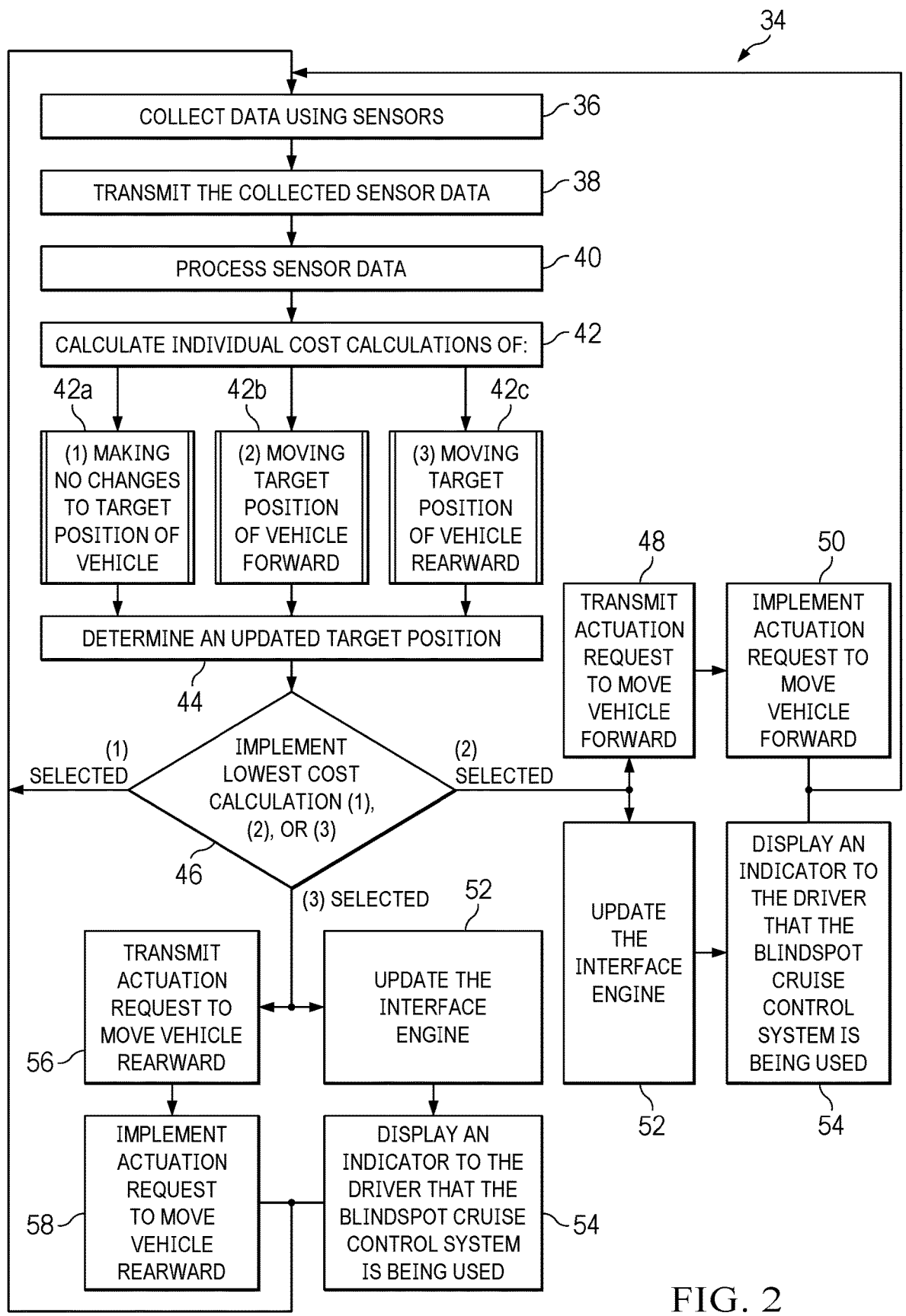
FIG. 2 is a flowchart of a method for implementing the blindspot aware cruise control system of FIG. 1, according to one or more embodiments.

With reference to FIG. 2 and continuing reference to FIG. 1, a method 34 for determining whether to implement blindspot aware cruise control, according to one or more embodiments. Method 34 is illustrated as a set of operations or blocks 36 through 58 and is described with continuing reference to FIG. 1. Not all of the illustrated blocks 36 through 58 may be performed in all embodiments of method 34. One or more blocks that are not expressly illustrated in FIG. 2 may be included before, after, in between, or as part of the blocks 36 through 58. In some embodiments, one or more of the blocks 36 through 58 may be implemented, at least in part, by a controller, the blindspot aware cruise control engine 30, and/or the vehicle control unit 16, in the form of executable code stored on non-transitory, tangible, machine-readable media that when run by one or more processors may cause the one or more processors to perform one or more of the processes. In one or more embodiments, the blocks in method 34 are performed within a vehicle, such as vehicle 12 in FIG. 1, by a vehicle control unit 16, such as an ECU and/or the blindspot aware cruise control engine 30.

In an example embodiment, the method 34 includes: collecting data using sensors at block 36; transmitting the sensor data at block 38; processing sensor data at a block 40; at a block 42, calculating individual cost calculations of: (1) making no changes to the target position of the vehicle at a block 42a, (2) moving the target position of vehicle forward at a block 42b, and (3) moving the target position of the vehicle rearward at a block 42c; determining an updated target position at a block 44; at a block 46, implementing the lowest cost calculation between the cost calculation options (1), (2), and (3) from the block 42. If (1) making no changes to the target position of the vehicle is the lowest cost calculation option, then the method proceeds back to block 36 of collecting data using sensors. If (2) moving the target position of vehicle forward is selected as the lost cost calculation option, the method proceeds to transmitting actuation request to move vehicle forward at a block 48, then implements the actuation request to move the vehicle forward at a block 50, updates the interface engine at a block 52 by displaying an indicator to the driver that the blindspot cruise control system is being used at a block 54, and the method proceeds back to the block 36. If (3) moving the target position of vehicle rearward is selected as the lost cost calculation option, the method proceeds to transmitting actuation request to move vehicle rearward at a block 56, then implements the actuation request to move the vehicle rearward at a block 58, updates the interface engine at the block 52 by displaying an indicator to the driver that the blindspot cruise control system is being used at the block 54, and the method proceeds back to the block 36.

In some embodiments, the method 34 begins by a driver of a vehicle, such as vehicle 12 selecting to turn on the blindspot cruise control. In some embodiments, selecting cruise control by the driver turns on the blindspot cruise control. In other embodiments, blindspot aware cruise control is an additional feature to the vehicle 12's cruise control. In other embodiments, the blindspot cruise control is automatic and automatically begins to collect data using sensors, such as sensors 28. In some embodiments, the driver of vehicle 12 may select to turn on or off the blindspot cruise control engine 30.

In some embodiments, sensors 28 include long range RADAR sensors, Front RADAR sensors, Rear RADAR sensors, Side RADAR sensors, LIDAR, and any combination thereof. In some embodiments, the sensor data is being used to determine distance, velocity of vehicle 12 and surrounding vehicles, and the like. In some embodiments, the sensor engine 26 collects the sensor data at the block 36.

In one or more embodiments, the sensor data from the block 36 is transmitted to the blindspot aware cruise control engine 30 before it is aggregated and/or processed at the block 40. In other embodiments, the sensor engine 26 collects and aggregates the sensor data before sending the aggregated sensor data to the blindspot aware cruise control engine 30. In some embodiments, the aggregated sensor data is transmitted to the blindspot aware cruise control engine 30 for processing at the block 40. In some embodiments, the blindspot aware cruise control engine 30 is an Advanced Driver Assistance System (ADAS) and/or ADAS ECU. Therefore, in one or more embodiments, the sensor data is transmitted at the block 38 to the ADAS for processing the sensor data at the block 40.

In some embodiments, processing the sensor data includes aggregating the sensor data collected at the block 36. In one or more embodiments, each of the sensors 28 aggregate their own individual data over a period of time at the block 40. For example, long range RADAR sensors may aggregate the sensor data of only the long-range Radar sensors over a period of time. However, in other embodiments, a plurality of sensor data is combined or aggregated such as e.g., long range RADAR sensors, Front RADAR sensors/front corner RADAR sensors, and rear corner RADAR sensors/Rear RADAR sensors at the block 40. In some embodiments, the processing block 40 occurs at the vehicle control unit 16 and/or the sensing engine 26 rather than the blindspot aware control engine 30. In other embodiments, the blindspot aware cruise control engine 30 is an Advanced Driver Assistance System (ADAS) and/or ADAS ECU that processes all of the requisite sensor data at the block 40.

Figure 3A:
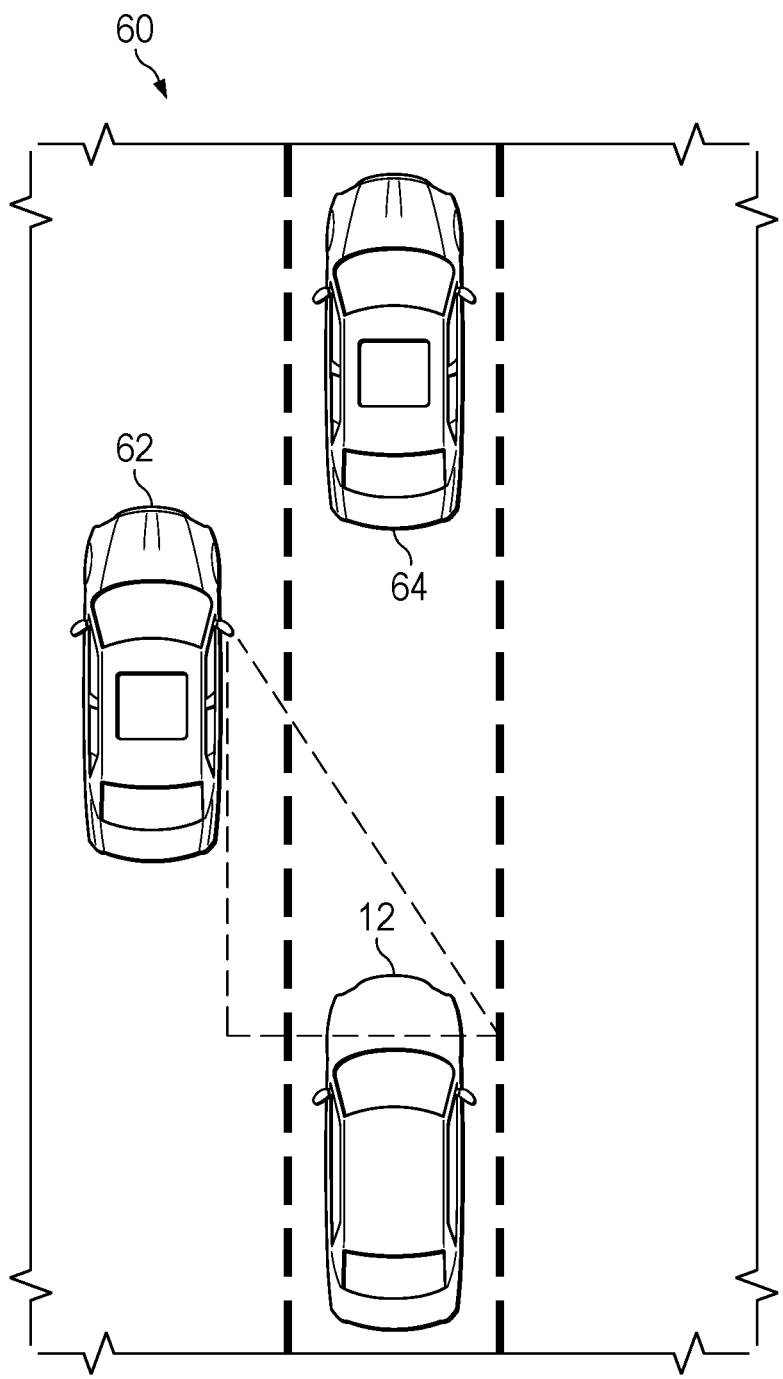
FIG. 3a is a diagrammatic illustration of a first vehicle in a blindspot of a second vehicle, according to one or more embodiments.
Figure 3B:
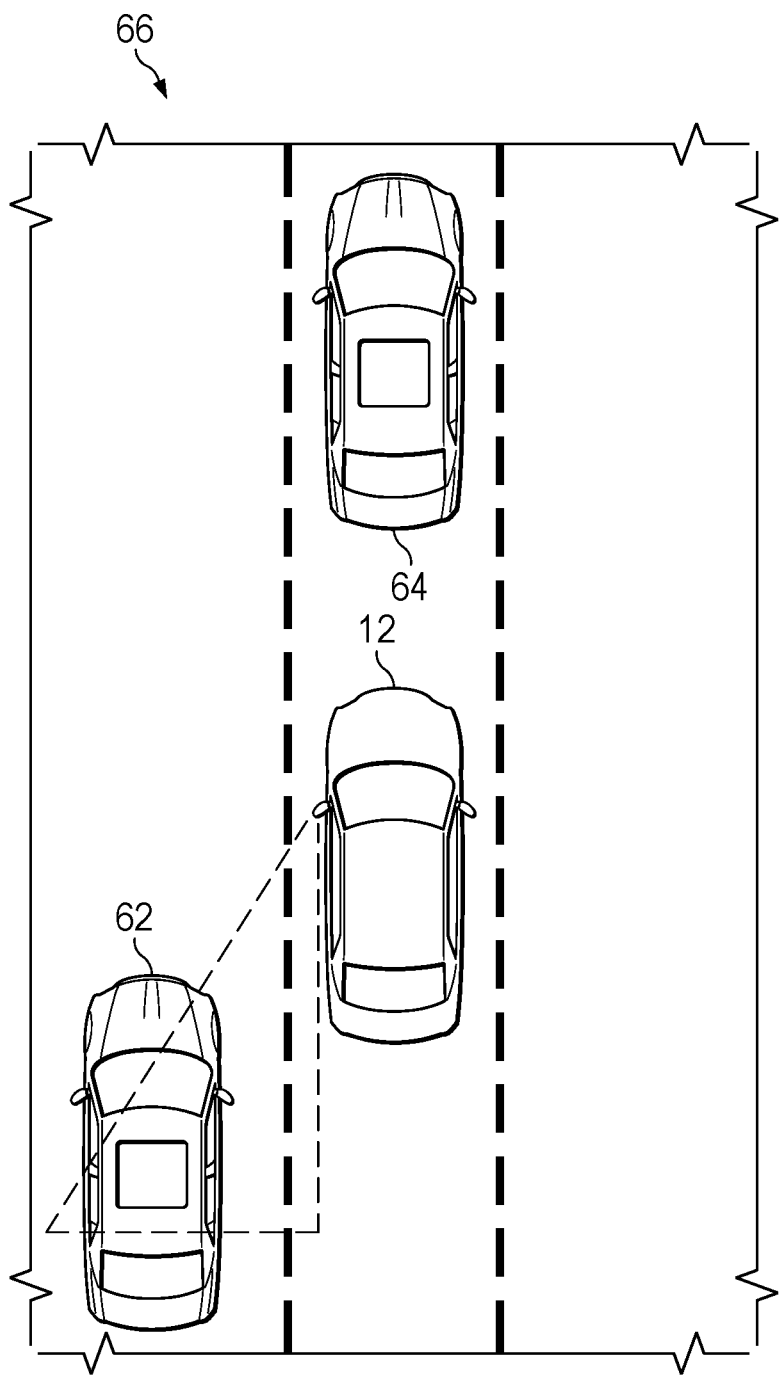
FIG. 3b is a diagrammatic illustration of the second vehicle in a blindspot of the first vehicle, according to one or more embodiments.

Referring now to FIGS. 3A and 3B, with continuing reference to FIGS. 1 and 2, reference numeral 60 shows a diagrammatic illustration of the vehicle 12, being in the blind spot of a second vehicle 62 and following behind a third vehicle 64, according to one or more embodiments, and reference numeral 66 shows an example diagrammatic illustration of the second vehicle 62 being in the blindspot of the vehicle 12, according to one or more embodiments. The triangular shaped region in FIG. 3A shows the blindspot region of the second vehicle 62, whereas the triangular shaped region in FIG. 3B shows the blindspot region of the vehicle 12. At blocks 36-40 of FIG. 2, the sensors may include one or more long range RADAR sensors that collect data at block 36, transmit the long-range RADAR sensor data at block 38, and process the long-range RADAR sensor data to determine distance from the vehicle 12 to the third vehicle 64 and/or determine the distance from the third vehicle 64 to the vehicle 12 at the block 40. At blocks 36-40 of FIG. 2, the sensors may include one or more front RADAR sensors that collect data at block 36, transmit the front RADAR sensor data at block 38, and process the front RADAR sensor data to determine if the vehicle 12 is in the blindspot of vehicle 62 (e.g., as shown in FIG. 3A) at block 40. At blocks 36-40 of FIG. 2, the sensors may include one or more rear RADAR sensors that collect data at block 36, transmit the rear RADAR sensor data at the block 38, and process the rear RADAR sensor data to determine if the vehicle 12 is in the second vehicle 62 is in the blind spot of vehicle 12 (e.g., as shown in FIG. 3B) at the block 40.

Referring to FIG. 2, with continuing reference to FIGS. 1 and 3A and 3B, the block 42, calculating the individual cost calculations of: (1) making no changes to the target position of the vehicle at the block 42a, (2) moving the target position of vehicle forward at the block 42b, and (3) moving the target position of the vehicle rearward at the block 42c calculates each action. In some embodiments, the blindspot aware cruise control engine 30 of FIG. 1 calculates each action cost by the relative position cost ($s_r$), the relative velocities cost ($v_r$), the time to collision cost (ttc), size of the second vehicle 62 (size), and the cost to execute the action (action) to determine the total cost (cost) to perform the action. Therefore, depending on the initial conditions, the avoidance logic of the blindspot aware cruise control engine 30 will be different. Then the blindspot aware cruise control engine 30 of FIG. 1, takes the minimum cost calculation between (1) making no changes to the target position of the vehicle ("Do Nothing"), (2) moving the target position of vehicle forward ("Move Forward"), and (3) moving the target position of the vehicle rearward ("Move Rearward") to determine the "Ideal System Action".

$$s_r + v_r + ttc + size + action = cost$$

Min (Cost (Do Nothing)(Move Forward)(Move Rearward))=Ideal System Action For example, if the cost calculation to do nothing was calculated to be 120, the cost calculation to move forward was calculated to be 150, and the cost calculation to move rearward was to 10, then the method would select implementing option (3) in the block 46 and then proceed to blocks 52-58. In some embodiments, a different cost calculation analysis metric is used to weight the three options of (1), (2), and (3). In other embodiments, the variables of the above equation may be each weighted differently. In some embodiments, one or more of the variables may be excluded to simplify the cost calculation estimate. In one or more embodiments, additional variables may be added to determine the ideal system action. In some embodiments, the cost calculations are mathematical cost calculations. In some embodiments, block 44 is included in the block 42 calculating the individual cost calculations of: (1) making no changes to the target position of the vehicle at the block 42a, (2) moving the target position of vehicle forward at the block 42b, and (3) moving the target position of the vehicle rearward at the block 42c. In some embodiments, there may be additional vehicles to consider which may change the cost calculation function. In some embodiments, the size of the vehicle is the length of the second vehicle 62. If the length of the second vehicle 62 is long like a semi-truck, then the solution of the cost calculation function considers whether passing is feasible. If passing is not feasible due to the length of the second vehicle 62, the cost calculation function will determine that the "move rearward" or "do nothing" option is the least costly option.

In some embodiments, the block 44 occurs prior to the block 42. In one or more embodiments, the target position may be used to calculate the individual cost calculations in the block 42. In other embodiments, the block 44 occurs simultaneously to the block 42. In some embodiments, the block 44 is omitted after calculating the individual cost calculation of (1) making no changes to target position of the vehicle because the updated target position would be the same as the previous target position. In some embodiments, the target position is the position that vehicle 12 should be from the third vehicle 64 and/or the second vehicle 62 to safely avoid the blindspot of vehicle 62. In one or more embodiments, the target position is the position that vehicle 12 should be from the third vehicle 64 and/or the second vehicle 62 to safely avoid the second vehicle 62 being in vehicle 12's blindspot. In other embodiments, the target position is the position that vehicle 12 should be from the third vehicle 64 to safely follow vehicle 12 and the position that avoids being either in the blindspot of the second vehicle 62 or having the second vehicle 62 in the blindspot of vehicle 12. In one or more embodiments, the target position refers to the longitudinal position with respect to the third vehicle 64 and/or the second vehicle 62. In one or more embodiments, the method further includes determining an initial target position of the vehicle 12 during block 40.

In the block 46, if (1) make no changes to the target position of the vehicle 12 of the block 42 is the lowest cost calculation option, then the vehicle 12 does not need to make any adjustments to the longitudinal position of the vehicle 12. Therefore, when (1) is the lowest cost calculation option, the method proceeds back to the block 36 unless the blindspot cruise control system is deactivated or turned off by the driver of vehicle 12.

In the block 46, if (2) moving the target position of vehicle forward is the lowest cost calculation option, then the method proceeds to the block 48 to transmit actuation request to move the vehicle forward. The block 48 instructs the vehicle 12 to actively adjust the longitudinally position of vehicle 12 to move the vehicle 12 forward. In some embodiments, the vehicle 12 is moved forward with respect to the initial target position. In some embodiments, the vehicle 12 is moved forward based on the updated target position. In some embodiments, the vehicle 12 is moved forward to be out of the blindspot of vehicle 62 but still maintaining a safe distance to the preceding third vehicle 64. In other embodiments, the vehicle 12 is moved forward to get the second vehicle 62 out of the vehicle 12 blindspot but still maintaining a safe distance to the preceding third vehicle 64. In some embodiments, the block 48 transmits the instructions from the blindspot aware cruise control engine 30 to the vehicle control unit 16 to the operational equipment engine 24. In other embodiments, the block 48 transmits the instructions or actuation request to the operational equipment engine 24 directly from the blindspot aware cruise control engine 30. In some embodiments, the operational equipment engine 24 includes a vehicle battery, a motor, a drivetrain or transmission, a steering system, and a braking system, which may be in part changed due to actuation request sent by the blindspot aware cruise control engine 30 and/or the vehicle control unit 16 to be implemented at block 50. In some embodiments, the actuation request is sent from the blindspot aware cruise control engine 30 and/or the vehicle control unit 16 to the vehicle stability control (VSC) and the Electronic Fuel Injector (EFI) to be implemented at the block 50. In some embodiments, the implementation of the actuation request to move the vehicle forward occurs automatically. In some embodiments, the block 52 and/or the block 54 occur simultaneously to or prior to the block 48 and/or the block 50. In some embodiments, when (2) is selected as the lowest cost calculation option, the blindspot aware cruise control engine 30 sends an update to the interface engine 32 at the block 52. In some embodiments, the interface engine 32 includes a display and/or user interface to the driver of the vehicle 12. In some embodiments, at the block 54, when (2) is selected as the lowest cost calculation option, the interface engine will update to display an indicator to the driver of vehicle 12 that the blindspot cruise control system 10 is being used. In some embodiments, the interface engine of the block 52 is different and distinct from the interface engine 32. In one or more embodiments, the vehicle is different and distinct from vehicle 12.

In the block 46, if (3) moving the target position of vehicle rearward is the lowest cost calculation option, then the method proceeds to the block 56 to transmit actuation request to move the vehicle rearward or back. The block 56 instructs the vehicle 12 to actively adjust the longitudinally adjust the position of vehicle 12 to move the vehicle 12 rearward. In some embodiments, the vehicle 12 is moved rearward with respect to an original target position. In some embodiments, the vehicle 12 is moved rearward based on the updated target position. In one or more embodiments, the vehicle 12 is moved rearward with respect to the third vehicle 64. In some embodiments, the vehicle 12 is moved rearward to be out of the blindspot of vehicle 62 and to maintain a safe distance to the preceding third vehicle 64. In other embodiments, the vehicle 12 is moved rearward to get the second vehicle 62 out of the vehicle 12 blindspot and to maintain a safe distance to the preceding third vehicle 64. In some embodiments, the block 56 transmits the instructions from the blindspot aware cruise control engine 30 to the vehicle control unit 16 to the operational equipment engine 24. In other embodiments, the block 56 transmits the instructions or actuation request to the operational equipment engine 24 directly from the blindspot aware cruise control engine 30. In some embodiments, the operational equipment engine 24 includes a vehicle battery, a motor, a drivetrain or transmission, a steering system, and a braking system, which may be in part changed due to actuation request sent by the blindspot aware cruise control engine 30 to be implemented at the block 58. In some embodiments, the actuation request is sent from the blindspot aware cruise control engine to the vehicle stability control (VSC) and the Electronic Fuel Injector (EFI) to be implemented at block 58. In some embodiments, the implementation of the actuation request to move the vehicle rearward occurs automatically. In some embodiments, the block 52 and/or the block 54 occur simultaneously to or prior to the block 56 and/or the block 58. In some embodiments, when (3) is selected as the lowest cost calculation option, the blindspot aware cruise control engine 30 sends an update to the interface engine 32 at the block 52. In some embodiments, the interface engine 32 includes a display and/or user interface to the driver of the vehicle 12. In some embodiments, at the block 54, when (3) is selected as the lowest cost option, the interface engine will update to display an indicator to the driver of vehicle 12 that the blindspot cruise control system 10 is being used.

Once the longitudinal position of the vehicle 12 is adjusted to the new target position and/or when the vehicle 12 is no longer in a blindspot and/or has the second vehicle 62 in its blindspot, then the method 34 proceeds back to the block 36. In some embodiments, the blindspot aware cruise control system 10 does not proceed back to the block 36 if the vehicle 12 is idling, if the vehicle 12 is turned off, if a gas pedal is pressed, if a brake is pressed, if cruise control is canceled, or if the blindspot cruise control system 10 is turned off. In some embodiments, the method 34 does not proceed back to the block 36 until both of the block 54 and the block 58 are implemented. In other embodiments, the sensors 28 are continually collecting sensing data, however, the block 42 is not implemented until the last cost calculation is implemented. In some embodiments, once the block 54 occurs, then the method 34 proceeds to begin again.

In some embodiments, the method 34 also includes using the sensors 28 to determine a first position of the vehicle 12 with relation to one or more surrounding vehicles, such as second vehicle 62 and the third vehicle 64. In some embodiments, the method 34 calculates the distance from the updated target position at block 44 to the first position. In some embodiments, the difference between the updated target position from block 44 and the first position is used in the calculating individual cost calculations at block 42.

Figure 4A:
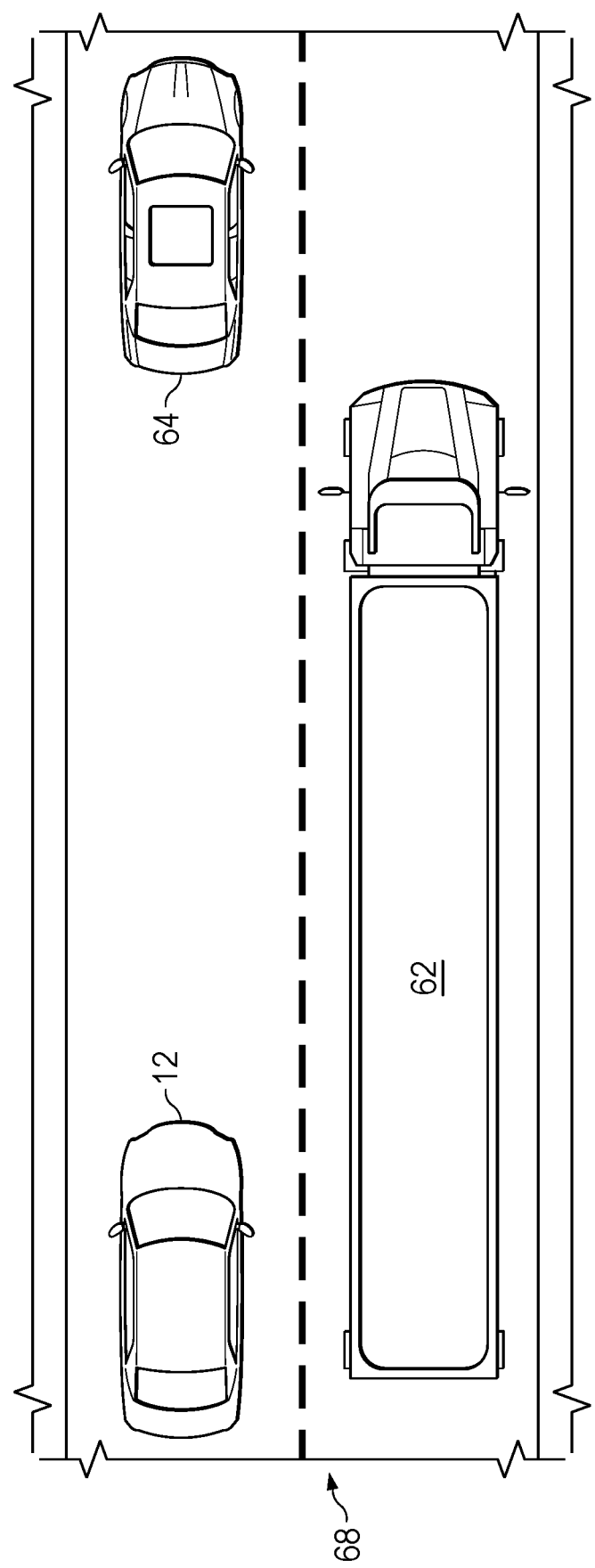
FIG. 4a is a diagrammatic illustration of a first vehicle in an initial system state, according to one or more embodiments.

Referring to FIG. 4A, with continuing reference to FIGS. 1-3B, an example initial system state, in one embodiment, is generally shown with reference numeral 68. The initial system state 68 shows vehicle 12 following the third vehicle 64 in the same lane, with the second vehicle 62 in adjacent lane. The second vehicle 62 in the adjacent lane, in this example, is a semi-truck, but may be any other type of vehicle. All speeds are currently equal between vehicle 12, the second vehicle 62, and the third vehicle 64. The vehicle 12 is in the blindspot of the second vehicle 62.

Figure 4B:
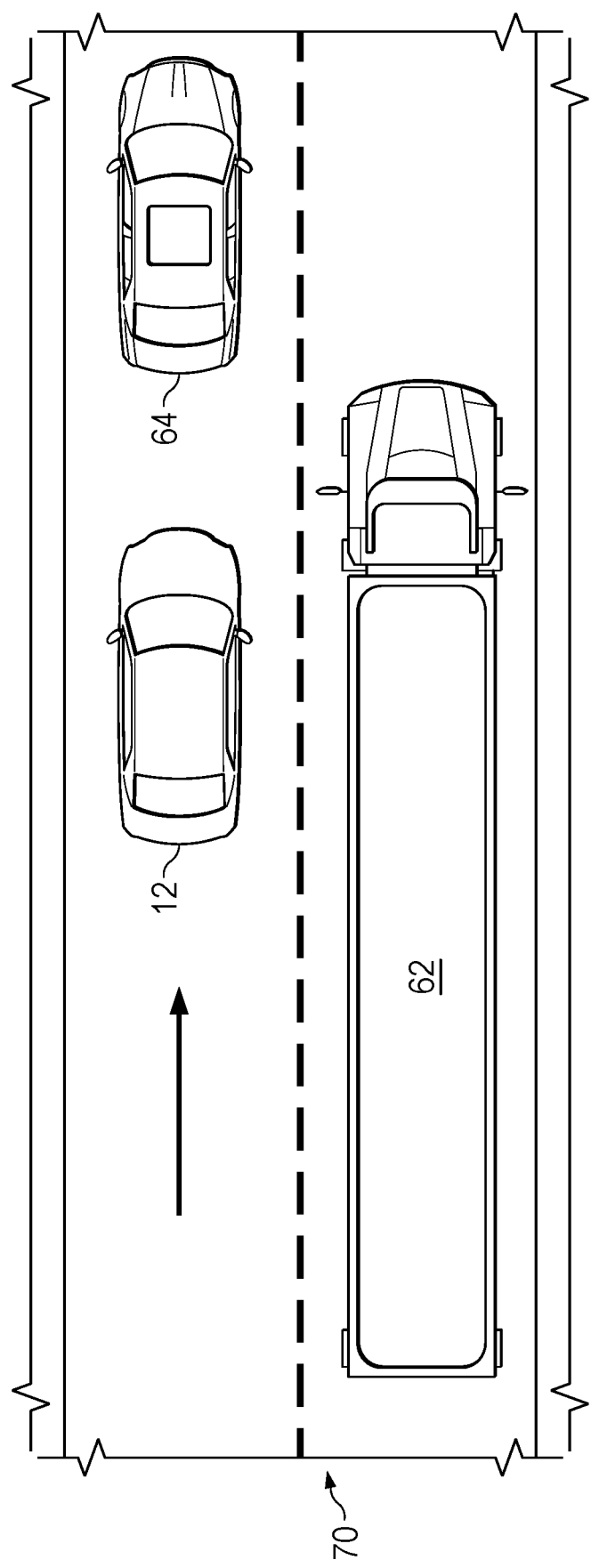
FIG. 4b is a diagrammatic illustration of the first vehicle in a "move forward" state in comparison to the initial system state, according to one or more embodiments.

Referring to FIG. 4B, with continuing reference to FIGS. 1-4A, an example "move forward" system state, in one embodiment, is generally shown with reference numeral 70. The "move forward" system state 70 shows vehicle 12 following vehicle 64 in the same lane, with second vehicle 62 in adjacent lane. The second vehicle 62 in the adjacent lane, in this example, is a semi-truck, but may be any other type of vehicle. The vehicle 12 has moved up (changed its longitudinal position from the initial system state) and is now longitudinally closer to the third vehicle 64. Therefore, vehicle 12 increased speed temporarily to decrease follow distance to third vehicle 64 with the goal to move out of the second vehicle 62's blindspot. By moving the vehicle 12 forward in this scenario, the vehicle 12 may still be in the blindspot of the second vehicle 62. Additionally, the vehicle 12 may be too close to the preceding third vehicle 64. Therefore, by accelerating and moving the vehicle forward in the scenario may be even more dangerous or costly than the "do nothing" system described below. In some embodiments, the speed of third vehicle 64 and the second vehicle 62 are equal. In other embodiments, the speed of the second vehicle 62 and the third vehicle 64 are equivalent to the second vehicle 62 and the third vehicle 64 in the initial system state.

Figure 4C:
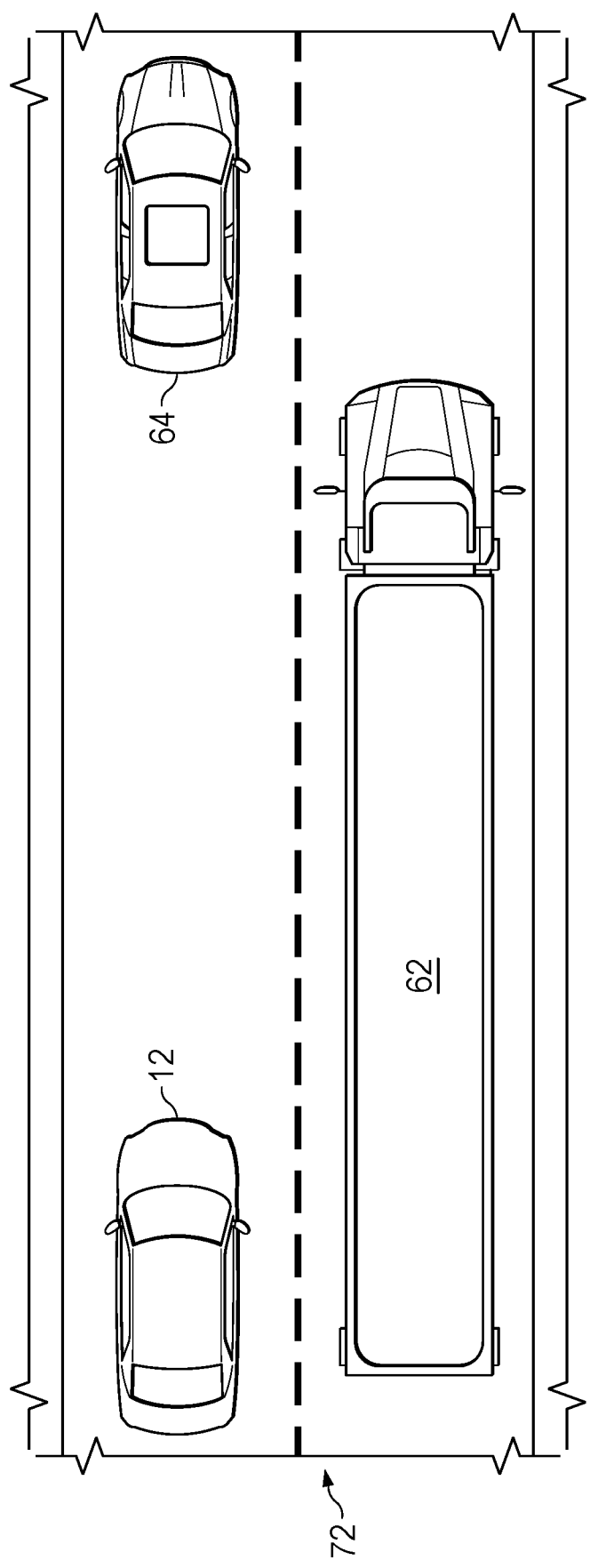
FIG. 4c is a diagrammatic illustration of the first vehicle in a "do nothing" state in comparison to the initial system state, according to one or more embodiments.

Referring to FIG. 4C, with continuing reference to FIGS. 1-4B, an example "do nothing" system state, in one embodiment, is generally shown with reference numeral 72. The "do nothing" system state 70 shows vehicle 12 following the third vehicle 64 in the same lane, with the second vehicle 62 in adjacent lane. The second vehicle 62 in the adjacent lane, in this example, is a semi-truck, but may be any other type of vehicle. The vehicle 12 in the "do nothing" system state is identical to the vehicle 12 in the initial system state. The vehicle 12 remains in the blindspot of the second vehicle 62 for at least a period of time but is in a safe following distance from the third vehicle 64. In some embodiments, the "do nothing" system is selected by the blindspot cruise control engine 30 when the speed of the vehicles will cause the vehicle 12 to either be out of another vehicle's blindspot (e.g., the second vehicle 62) quickly or to quickly get a vehicle out of the blindspot of vehicle 12.

Figure 4D:
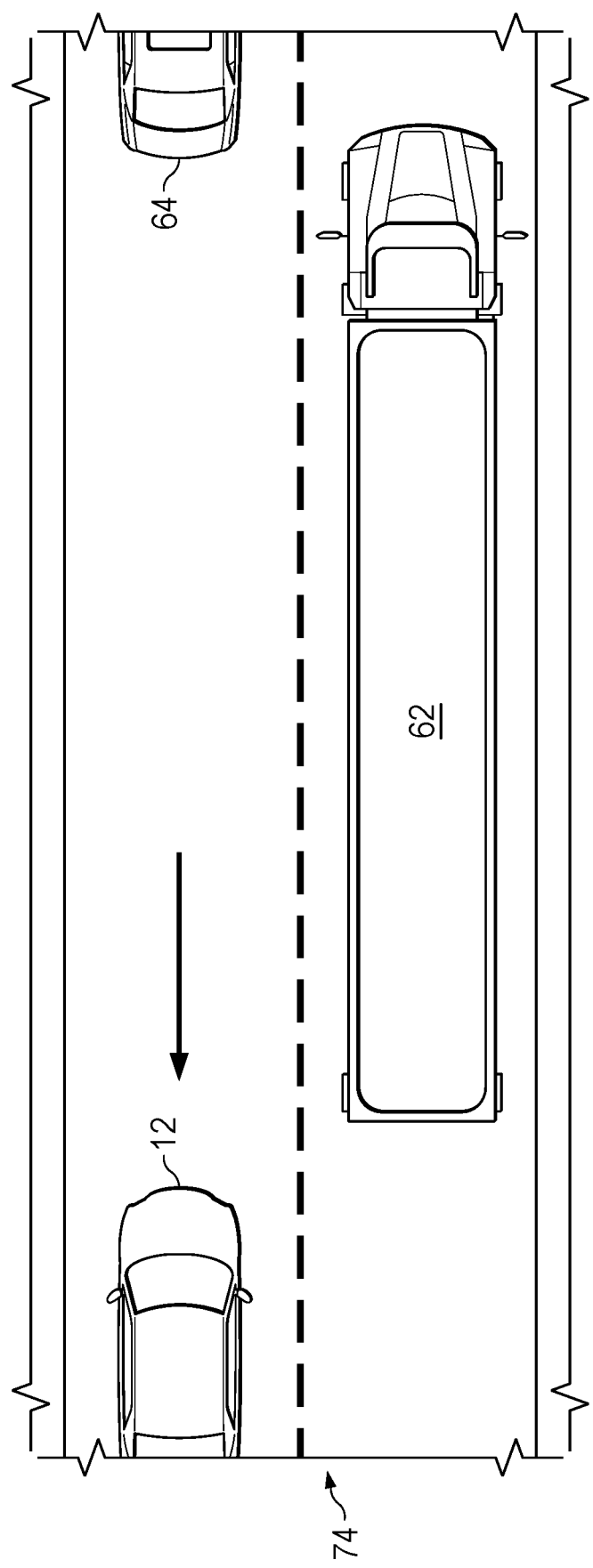
FIG. 4d is a diagrammatic illustration of the first vehicle in a "move rearward" state in comparison to the initial system state, according to one or more embodiments.

Referring to FIG. 4D, with continuing reference to FIGS. 1-4C, an example "move rearward" system state, in one embodiment, is generally shown with reference numeral 74. The "move rearward" system state 74 shows vehicle 12 following the third vehicle 64 in the same lane, with the second vehicle 62 in adjacent lane. The second vehicle 62 in the adjacent lane, in this example, is a semi-truck, but may be any other type of vehicle. The vehicle 12 has moved back (changed its longitudinal position from the initial system state) and is now longitudinally further away from the third vehicle 64. Therefore, the vehicle 12 temporarily decreased speed to increase follow distances to the third vehicle 64 until the vehicle 12 was out of the second vehicle 62's blindspot. The vehicle 12 has decelerated to position itself outside of the blindspot of the second vehicle 62 and maintains a safe distance from the third vehicle 64 that proceeds it. The blindspot aware cruise control system, such as the blindspot cruise control system 10, analyzes these three options ("do nothing," "move forward," and "move rearward") using a cost analysis to determine which is the most cost effective and thus, safest option. For this example, the lowest cost calculation is to move rearward as shown in FIG. 4D. Therefore, the blindspot aware cruise control system 10 would select this option to implement. In some embodiments, the speed of vehicle 64 and vehicle 62 are equal. In other embodiments, the speed of the second vehicle 62 and the third vehicle 64 are equivalent to the second vehicle 62 and the third vehicle 64 in the initial system state.

In some embodiments, the variables of the cost calculation function will change and thus, change, which option is the ideal system action or the lowest cost calculation. For example, if the second vehicle 62 was a motorcycle rather than a semi-truck, the move forward option may become more cost effective. FIGS. 4A-4D are only one diagrammatic example of the cost calculation function of the block 42 from FIG. 2 and is not meant to be limiting.

Figure 5:
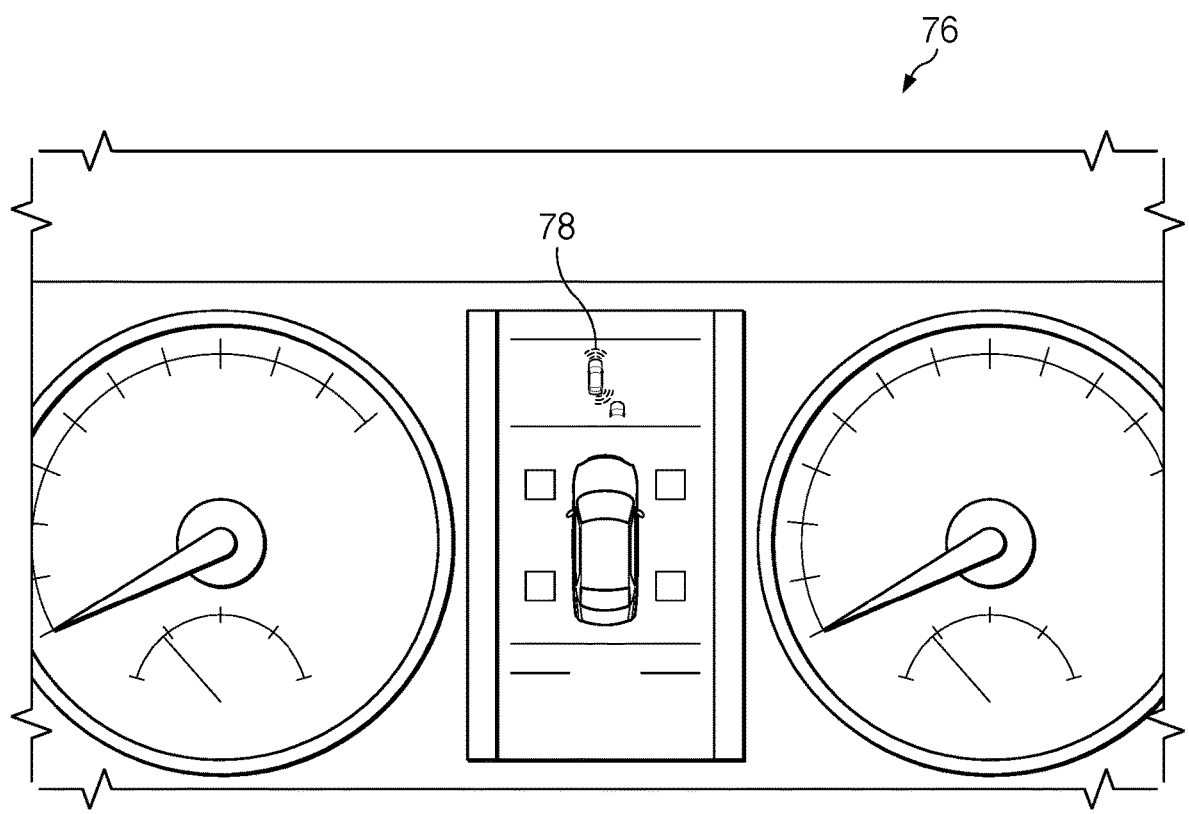
FIG. 5 is a diagrammatic illustration of a meter display, according to one or more embodiments.

Referring to FIG. 5, with continuing references to FIGS. 1-2, a meter display, in an embodiment, is generally referred to by reference numeral 76. The meter display 76 includes a visual indicator 78. The visual indicator, in some embodiments, is the same as described in FIGS. 1 and 2. The visual indicator 78 may be an icon with two vehicles, one of which is in the other vehicle's blindspot. In some embodiments, the visual indicator 78 may inform the driver of the vehicle that there is a vehicle in the driver's blind spot so the vehicle wants to move forward. In one or more embodiments, the visual indicator 78 may inform the driver of the vehicle that the vehicle is in another vehicle's blindspot. In some embodiments, the visual indicator 78 may inform the driver of the vehicle that the vehicle is avoiding someone in our blindspot. In one or more embodiments, the visual indicator 78 may inform the driver of the vehicle that there is a vehicle in the driver's blindspot so the vehicle wants to move rearward or decelerate. In some embodiments, the visual indicator 78 may include a beep or noise that accompanies the visual indicator 78. In one or more embodiments, the visual indicator 78 may be greyed out, not visible, or not lit when the blindspot cruise control is not being used. In some embodiments, the visual indicator 78 may be lit, change color, or be displayed graphically on a screen when the blindspot cruise control is being used. In one or more embodiments, the visual indicator 78 may be a meter, part of the display, part of the display located behind the steering wheel, and the like. In some embodiments, the visual indicator is an icon and/or graphical representation. In some embodiments, the indicator is an auditory indicator, such as producing a beep, rather than a visual indicator. In other embodiments, the indicator is selectable by the driver of the vehicle 12 to be a visual indicator and/or an auditory indicator. In some embodiments, the interface engine is different and distinct from the interface engine 32. In one or more embodiments, the vehicle is different and distinct from vehicle 12. In some embodiments, the indicator is different based on if the vehicle is moving rearward or forward. In other embodiments, the indicator is the same regardless, so long as the longitudinal position is actively being adjusted by the blindspot aware cruise control system 10. In some embodiments, the visual indicator is the indicator in block 54 of FIG. 2. In some embodiments, the visual indicator 78 is a different icon than the one shown in FIG. 5.

In some embodiments, the blindspot aware cruise control is implemented on multi-lane highways. In one or more embodiments, the cost calculation function takes into account multiple vehicles in the adjacent lane or lanes. In some embodiments, the vehicle 12 is considered an ego vehicle. The ego vehicle is the target vehicle that is using the blindspot aware cruise control system described herein. In one or more embodiments, the second vehicle 62 is considered a surrounding vehicle (SV), as it is a vehicle that is adjacent to the lane of the ego vehicle. In some embodiments, the third vehicle 64 is considered the preceding vehicle (PV), as it is in the same lane as the ego vehicle and is in front of the ego vehicle. In other embodiments, the third vehicle 64 is also considered a surrounding vehicle. In some embodiments, there are multiple SVs and/or multiple PVs. In some embodiments, the ego vehicle has SVs in both adjacent lanes, surrounding and/or near the ego vehicle. In some embodiments, the ego vehicle will be in the blindspots of both SV's and the cost calculation function will take into consideration this added variable. For example, the ego vehicle may temporarily decrease the Ego vehicle's speed in order to increase the following distance to the PV and so that the ego vehicle is out of both blind spots of the SVs.

In several example embodiments, the elements and teachings of the various illustrative example embodiments may be combined in whole or in part in some or all of the illustrative example embodiments. In addition, one or more of the elements and teachings of the various illustrative example embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several example embodiments, while different blocks, processes, and procedures are described as appearing as distinct acts, one or more of the blocks, one or more of the processes, and/or one or more of the procedures may also be performed in different orders, simultaneously, and/or sequentially. In several example embodiments, the blocks, processes and/or procedures may be merged into one or more blocks, processes, and/or procedures.

In several example embodiments, one or more of the operational blocks in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

The phrase "at least one of A and B" should be understood to mean "A; B; or both A and B." The phrase "one or more of the following: A, B, and C" should be understood to mean "A; B; C; A and B; B and C; A and C; or all three of A, B, and C." The phrase "one or more of A, B, and C" should be understood to mean "A; B; C; A and B; B and C; A and C; or all three of A, B, and C."

Although several example embodiments have been described in detail above, the embodiments described are examples only and are not limiting, and those skilled in the art will readily appreciate that many other modifications, changes, and/or substitutions are possible in the example embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112(f) for any limitations of any of the claims herein, except for those in which the claim expressly uses the word "means" together with an associated function.

What is claimed is:

1. A method comprising:
   measuring, using a plurality of sensors of a vehicle, distances to a first surrounding vehicle located in front of the vehicle and a second surrounding vehicle located in a blindspot of the vehicle;
   determining, using a vehicle control unit and based on the measured distances, that the second surrounding vehicle is located in the blindspot of the vehicle;
   calculating, using the vehicle control unit, the measured distance to the first surrounding vehicle, and the measured distance to the second surrounding vehicle, and based on the determination that the second surrounding vehicle is in the blindspot of the vehicle, individual cost calculations associated with moving the vehicle relative to the first surrounding vehicle and relative to the second surrounding vehicle to place the second surrounding vehicle outside of the blindspot of the vehicle and to maintain the vehicle at a safe distance to the first surrounding vehicle;

wherein calculating the individual cost calculations comprises analyzing any one or more of: a relative position cost, a relative velocities cost, a time to collision cost, a size of the second surrounding vehicle, and a cost to implement the individual cost calculations; and wherein the individual cost calculations comprise a first cost calculation associated with a cost of not changing an acceleration of the vehicle and a second cost calculation associated with a cost of changing the acceleration of the vehicle;

selecting, using the vehicle control unit, the second cost calculation as a lowest cost calculation between the first cost calculation and the second cost calculation;

updating a display to present an indicator notifying a driver of the vehicle that the acceleration of the vehicle is about to change in response to the second surrounding vehicle being in the blindspot of the vehicle;

transmitting, from the vehicle control unit to one or more components of the vehicle based on the selected lowest cost calculation, an actuation request to implement the selected lowest cost calculation; and changing, using the one or more components of the vehicle in response to the actuation request associated with the implementation of the selected lowest cost calculation, the acceleration of the vehicle to move the vehicle relative to the first surrounding vehicle and the second surrounding vehicle to place the second surrounding vehicle outside of the blindspot of the vehicle and to maintain the vehicle at a safe distance to the first surrounding vehicle.

2. The method of claim 1, further comprising:
measuring, using the plurality of sensors of the vehicle, a distance to a third surrounding vehicle;
determining, using the vehicle control unit and based on the measured distance to the third surrounding vehicle, that the vehicle is located in a blindspot of the third surrounding vehicle.

3. The method of claim 1,
wherein the second cost calculation is associated with a cost of increasing the acceleration of the vehicle; and
wherein the individual cost calculations further comprise a third cost calculation associated with a cost of decreasing the acceleration of the vehicle.

4. The method of claim 3, further comprising:
determining a first position of the vehicle based on the measured distances of the plurality of sensors.

5. The method of claim 4, wherein calculating the individual cost calculations further comprises:
determining an updated target position for the vehicle for each of the first cost calculation, the second cost calculation, and the third cost calculation.

6. The method of claim 1,
wherein a preceding vehicle is the first surrounding vehicle and an adjacent vehicle is the second surrounding vehicle; and
wherein the adjacent vehicle is in the blindspot of the vehicle.

7. The method of claim 6,
wherein the second cost calculation is associated with a cost of increasing the acceleration of the vehicle; and
wherein changing the acceleration of the vehicle, using the one or more components of the vehicle in response to the actuation request associated with the implementation of the selected lowest cost calculation, comprises increasing the acceleration of the vehicle such that the distance to the preceding vehicle is shortened.

8. The method of claim 6,
wherein the second cost calculation is associated with a cost of decreasing the acceleration of the vehicle; and
wherein changing the acceleration of the vehicle, using the one or more components of the vehicle in response to the actuation request associated with the implementation of the selected lowest cost calculation, comprises decreasing the acceleration of the vehicle such that the distance to the preceding vehicle is increased.

9. A system comprising:
an electronic fuel injector used to deliver fuel to an engine of a vehicle;
a sensor system comprising a plurality of sensors that are coupled to the vehicle and configured to measure distances to a first surrounding vehicle located in front of the vehicle and a second surrounding vehicle located in a blindspot of the vehicle; and
a vehicle control unit in communication with the electronic fuel injector and the sensor system and configured to control operation of the electronic fuel injector;
wherein the vehicle control unit is further configured to:
determine, using the measured distances, that the second surrounding vehicle is located in the blindspot of the vehicle;
calculate, using the measured distances to the first surrounding vehicle and the second surrounding vehicle, and based on the determination that the second surrounding vehicle is in the blindspot of the vehicle, individual cost calculations associated with moving the vehicle relative to the first surrounding vehicle and relative to the second surrounding vehicle to place the second surrounding vehicle outside of the blindspot of the vehicle and to maintain the vehicle at a safe distance to the first surrounding vehicle;
wherein, to calculate the individual cost calculations, the vehicle control unit is configured to analyze any one or more of: a relative position cost, a relative velocities cost, a time to collision cost, a size of the second surrounding vehicle, and a cost to implement the individual cost calculations; and
wherein the individual cost calculations comprise a first cost calculation associated with a cost of not changing an acceleration of the vehicle and a second cost calculation associated with a cost of changing the acceleration of the vehicle;
select the second cost calculation as a lowest cost calculation between the first cost calculation and the second cost calculation;
update a display to present an indicator notifying a driver of the vehicle that the acceleration of the vehicle is about to change in response to the second surrounding vehicle being in the blindspot of the vehicle;
send, based on the selected lowest cost calculation, an actuation command to the electronic fuel injector to change the acceleration of the vehicle by injecting more or less fuel to move the vehicle relative to the first surrounding vehicle and the second surrounding vehicle to place the second surrounding vehicle outside of the blindspot of the vehicle and to maintain the vehicle at a safe distance to the first surrounding vehicle.

10. The system of claim 9, wherein the plurality of sensors comprise any one or more of: long-range RADAR, front RADAR, rear RADAR, side RADAR, and LIDAR.

11. The system of claim 9, wherein the system further comprises:
a vehicle stability control, wherein the vehicle stability control is in communication with the vehicle control unit; and
wherein in response to the selection, the actuation command is sent to the vehicle stability control.

12. The system of claim 9, further comprising:
the display, wherein the display is updated to present the indicator further in response to the selection of the second cost calculation as the lowest cost calculation.

13. The system of claim 9,
wherein the plurality of sensors are further configured to measure a distance to a third surrounding vehicle; and
wherein the vehicle control unit is further configured to:
determine, using the measured distance to the third surrounding vehicle, that the vehicle is in a blindspot of the third surrounding vehicle.

14. The system of claim 13, wherein the vehicle control unit is further configured, to update the display to present a second indicator notifying the driver of the vehicle that the vehicle is in the blindspot of the third surrounding vehicle.

15. The system of claim 9, wherein, to calculate the individual cost calculations, the vehicle control unit is further configured to:
determine an updated target position for the vehicle for each of the first cost calculation and the second cost calculation.

16. A method comprising:
measuring, using a plurality of sensors of a vehicle, distances to one or more surrounding vehicles;
determining, using the measured distances, that:
(i) the vehicle has a surrounding vehicle of the one or more surrounding vehicles in a blindspot of the vehicle, or
(ii) the vehicle is in a blindspot of the surrounding vehicle of the one or more surrounding vehicles;
calculating, using the measured distance to the surrounding vehicle and based on the determination that (i) or (ii), individual cost calculations associated with moving the vehicle relative to the surrounding vehicle to place the surrounding vehicle outside of the blindspot of the vehicle if (i) or to place the vehicle outside of the blindspot of the surrounding vehicle if (ii), the individual cost calculations comprising:
a first cost calculation associated with a cost of not changing an acceleration of the vehicle;
a second cost calculation associated with a cost of increasing the acceleration of the vehicle; and
a third cost calculation associated with a cost of decreasing the acceleration of the vehicle;
wherein calculating the individual cost calculations comprises analyzing any one or more of: a relative position cost, a relative velocities cost, a time to collision cost, a size of the surrounding vehicle, and a cost to implement the individual cost calculations;
selecting either the second cost calculation or the third cost calculation as a lowest cost calculation;
sending, based on the selected lowest cost calculation, commands to components of the vehicle to implement the selected lowest cost calculation; and
changing, using the one or more components of the vehicle in response to the commands associated with implementing the selected lowest cost calculation, the acceleration of the vehicle to move the vehicle relative to the surrounding vehicle to place the surrounding vehicle outside of the blindspot of the vehicle if (i) or to place the vehicle outside of the blindspot of the surrounding vehicle if (ii).

* * * * *